United States Patent [19]

Wong et al.

[11] Patent Number: 5,679,389
[45] Date of Patent: Oct. 21, 1997

[54] CHEWING GUM COMPOSITIONS HAVING INCREASED FLAVOR AND SWEETNESS AND METHODS FOR PREPARING SAME

[75] Inventors: Lucy L. Wong, Jackson Heights; Eva Malinowski, Franklin Square, both of N.Y.; Hector Olaya, Parsippany; Michael Glass, Fair Lawn, both of N.J.

[73] Assignee: Warner-Lambert Company, Morris Plains, N.J.

[21] Appl. No.: 911,601

[22] Filed: Jul. 10, 1992

Related U.S. Application Data

[63] Continuation of Ser. No. 729,275, Jul. 12, 1991, abandoned.

[51] Int. Cl.$^6$ ........................................ A23G 3/30
[52] U.S. Cl. ........................ 426/3; 426/6; 426/534; 426/548; 426/650; 426/658
[58] Field of Search ........................ 426/3, 6, 658, 426/4, 5, 96, 548, 534, 650, 651

[56] References Cited

U.S. PATENT DOCUMENTS

| | | | |
|---|---|---|---|
| 4,497,832 | 2/1985 | Cherukuri et al. | 426/5 |
| 4,590,075 | 5/1986 | Wei et al. | 426/5 |
| 4,673,577 | 6/1987 | Patel | 426/5 |
| 4,722,845 | 2/1988 | Cherukuri et al. | 426/5 |
| 4,740,376 | 4/1988 | Yang | 426/5 |
| 4,752,481 | 6/1988 | Dokuzovic | 426/3 |
| 4,752,485 | 6/1988 | Sharma | 426/99 |
| 4,786,491 | 11/1988 | Patel | 424/48 |
| 4,803,082 | 2/1989 | Cherukuri et al. | 426/493 |
| 4,816,265 | 3/1989 | Cherukuri et al. | 426/5 |
| 4,863,745 | 9/1989 | Zibell | 426/5 |
| 4,885,175 | 12/1989 | Zibell | 426/5 |
| 4,931,293 | 6/1990 | Cherukuri et al. | 426/5 |
| 4,933,190 | 6/1990 | Cherukuri et al. | 426/5 |
| 4,981,698 | 1/1991 | Cherukuri et al. | 426/5 |
| 4,983,404 | 1/1991 | Raman et al. | 426/3 |
| 5,004,595 | 4/1991 | Cherukuri et al. | 424/3 X |

*Primary Examiner*—Leslie Wong
*Attorney, Agent, or Firm*—Linda A. Vag

[57] ABSTRACT

The present invention pertains to chewing gum composition having improved flavor and sweetness intensity which comprises (A) a gum base, (B) a bulking agent, (C) a flavoring agent, and (D) an effective amount of a homogeneous flavoring agent delivery system to provide upfront flavor and sweetness which comprises in percentages by weight of the delivery system (a) a spray dried flavoring agent present in an amount up to about 80%, and (b) a bulking agent present in an amount up to about 90%. The flavoring agent delivery system may further comprise a high intensity sweetening agent present in an amount up to about 80%, by weight of the flavoring agent delivery system. The flavoring agent delivery systems may be used in a wide variety of chewing gum compositions. The present invention also pertains to methods for preparing the flavoring agent delivery systems and the chewing gum compositions in which they may be used.

21 Claims, 12 Drawing Sheets

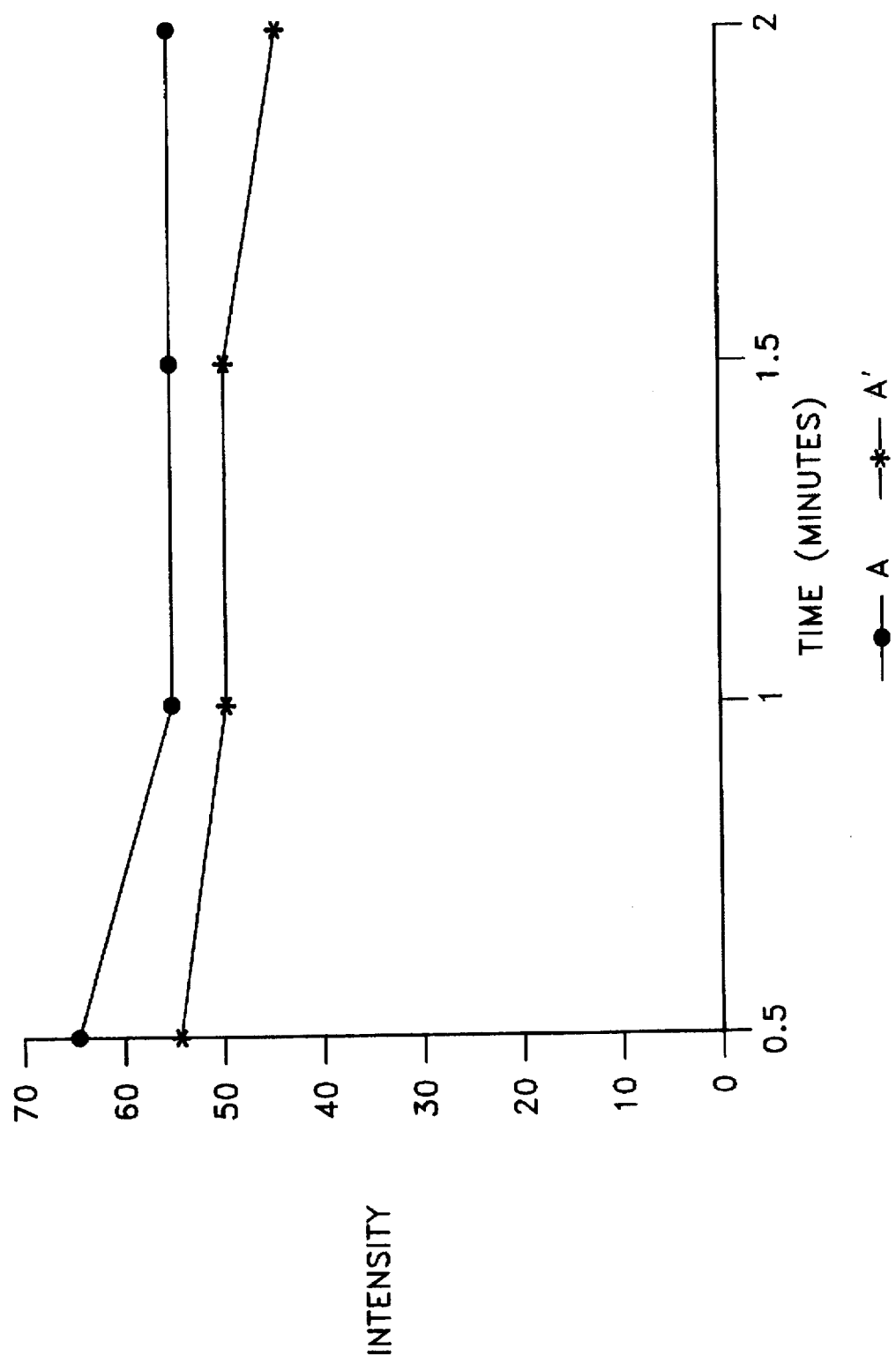
FIG-1 FLAVOR INTENSITY VS. TIME CINNAMON

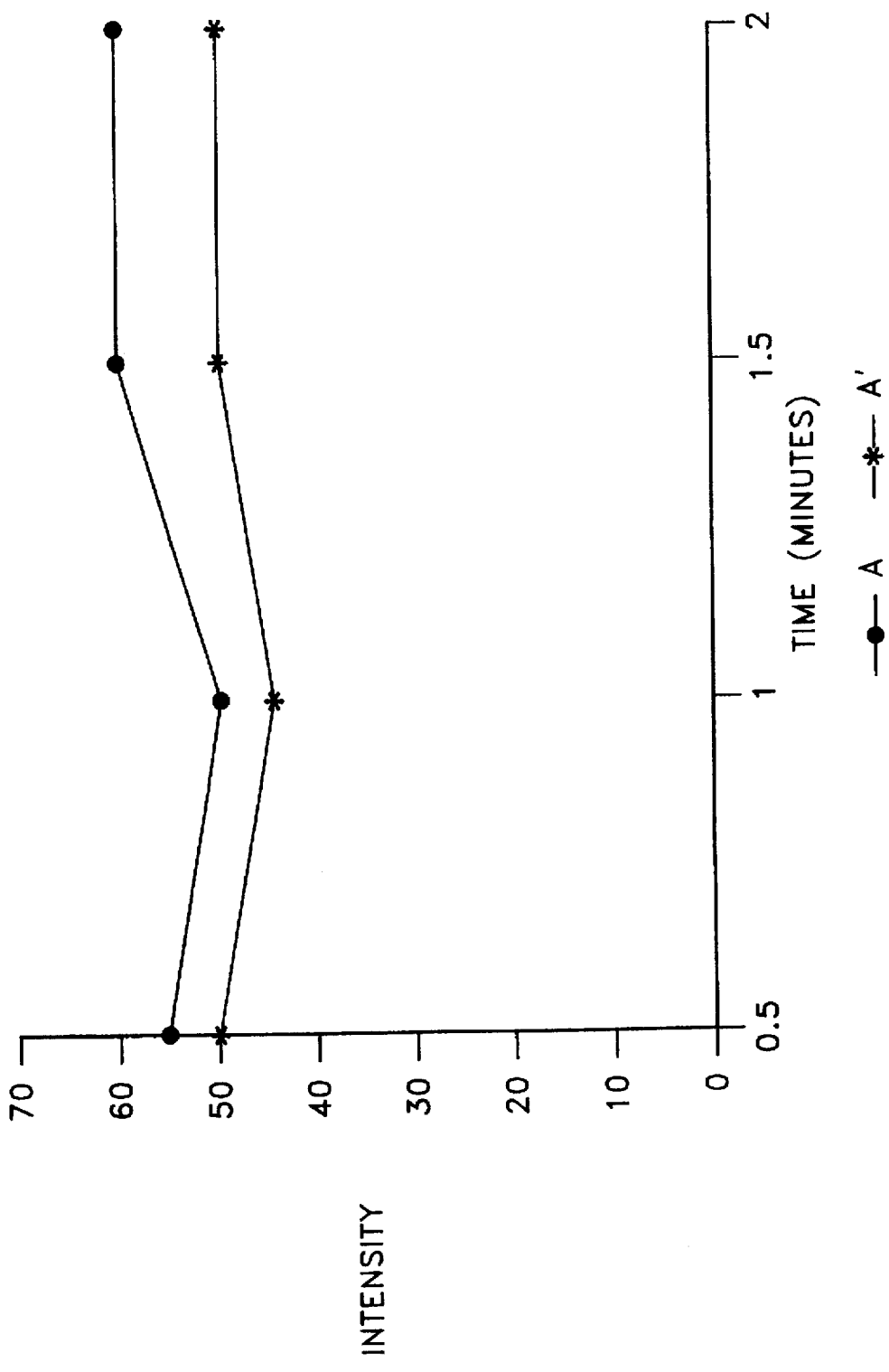

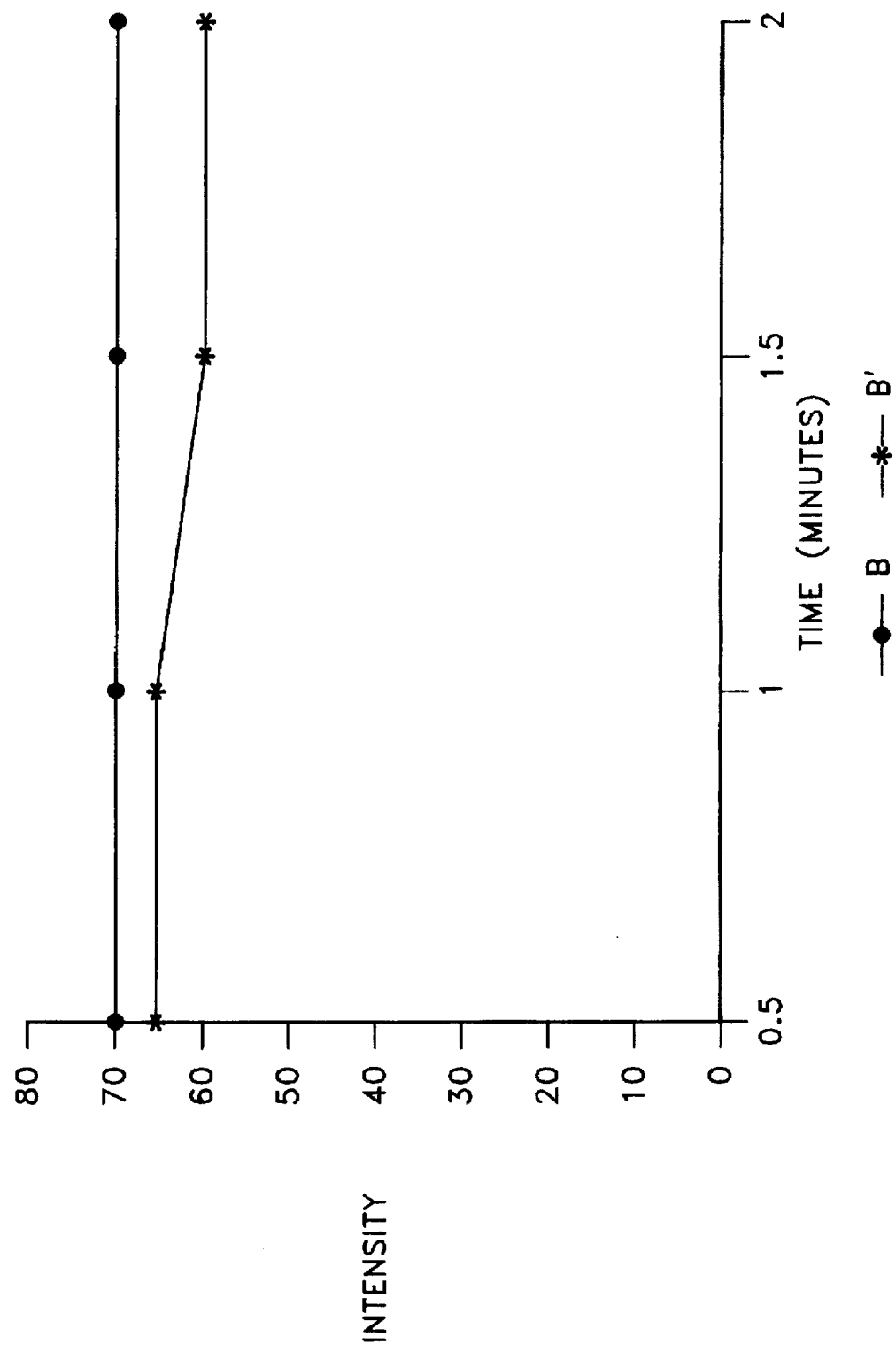

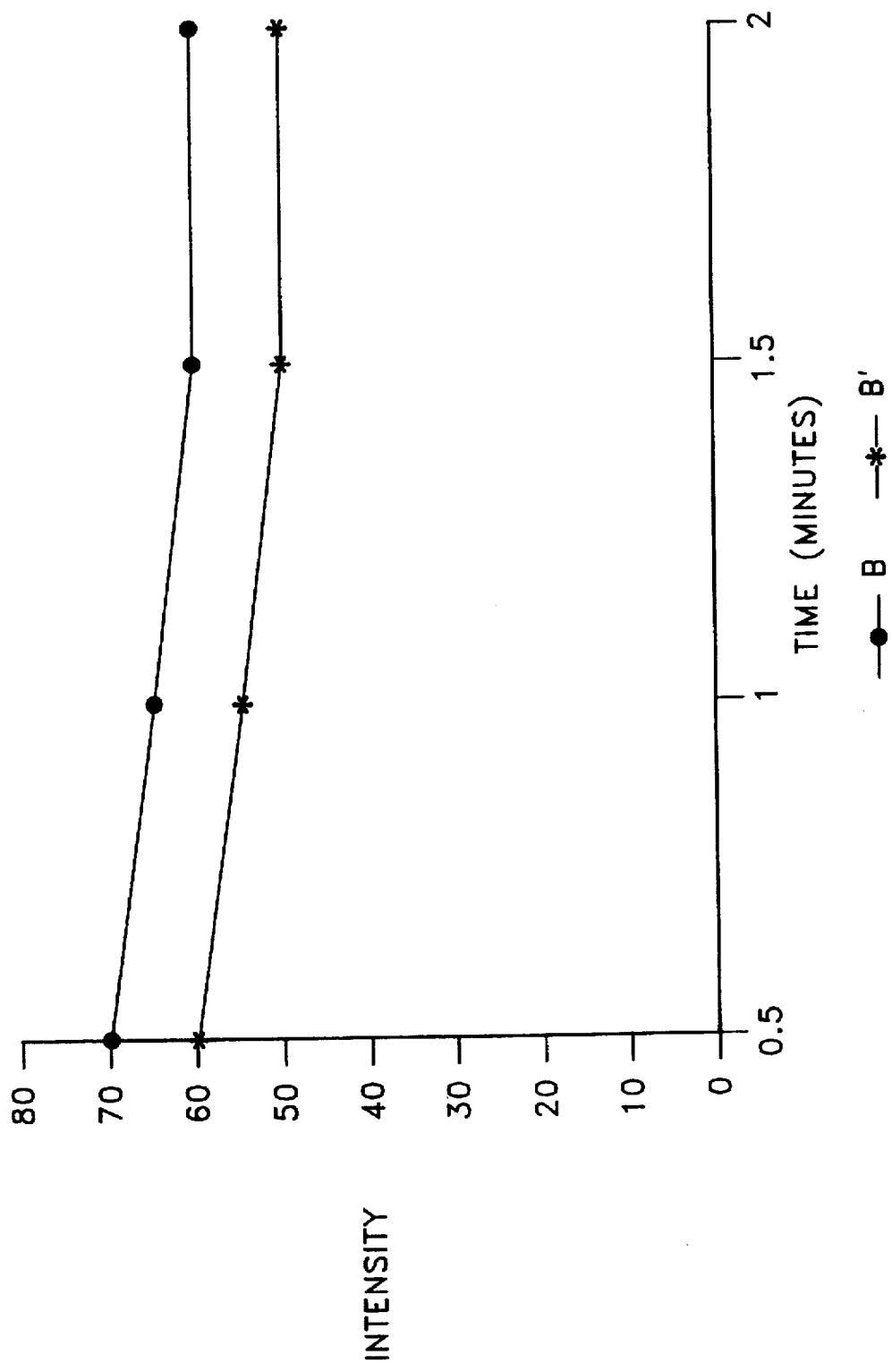

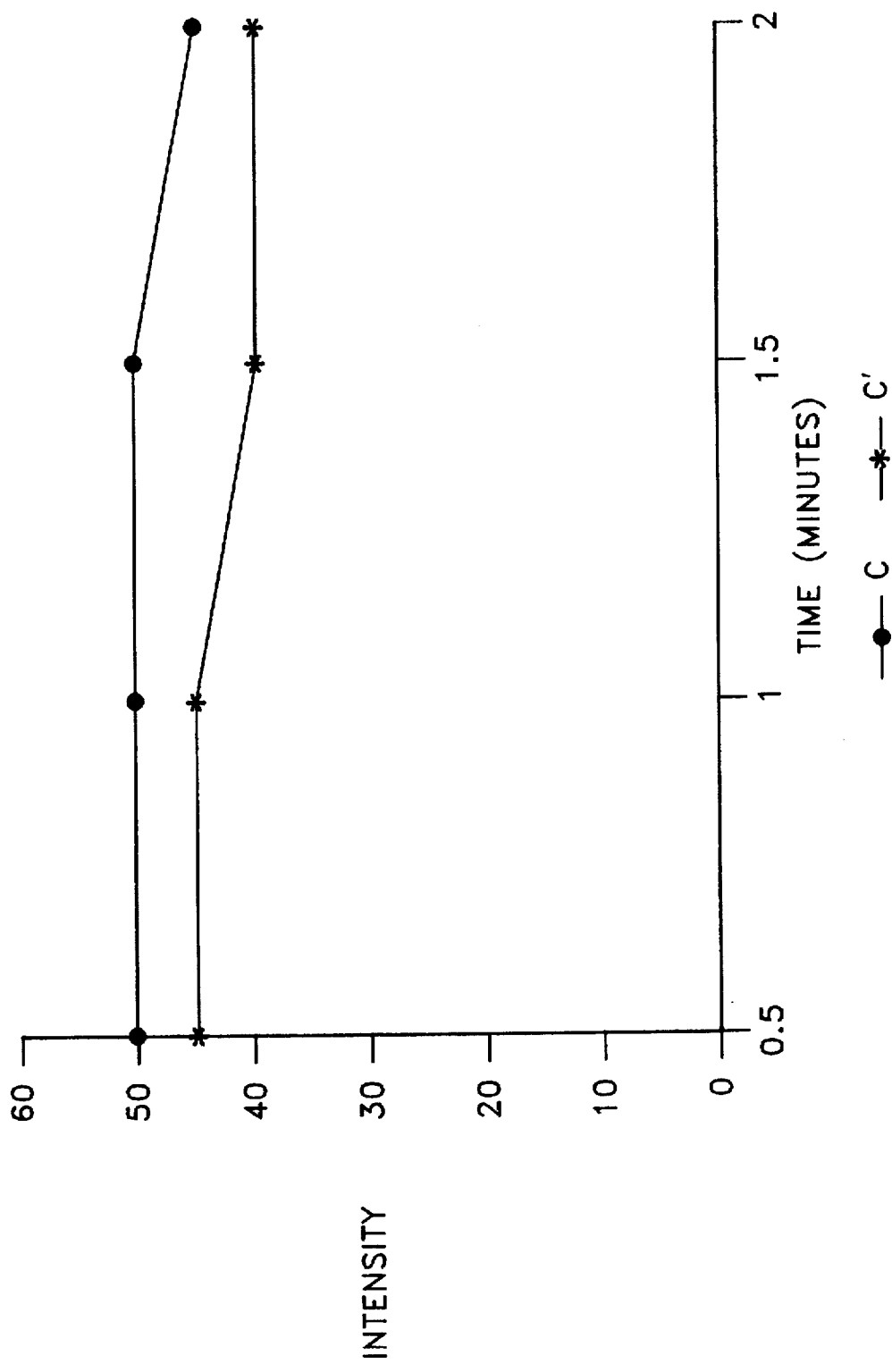

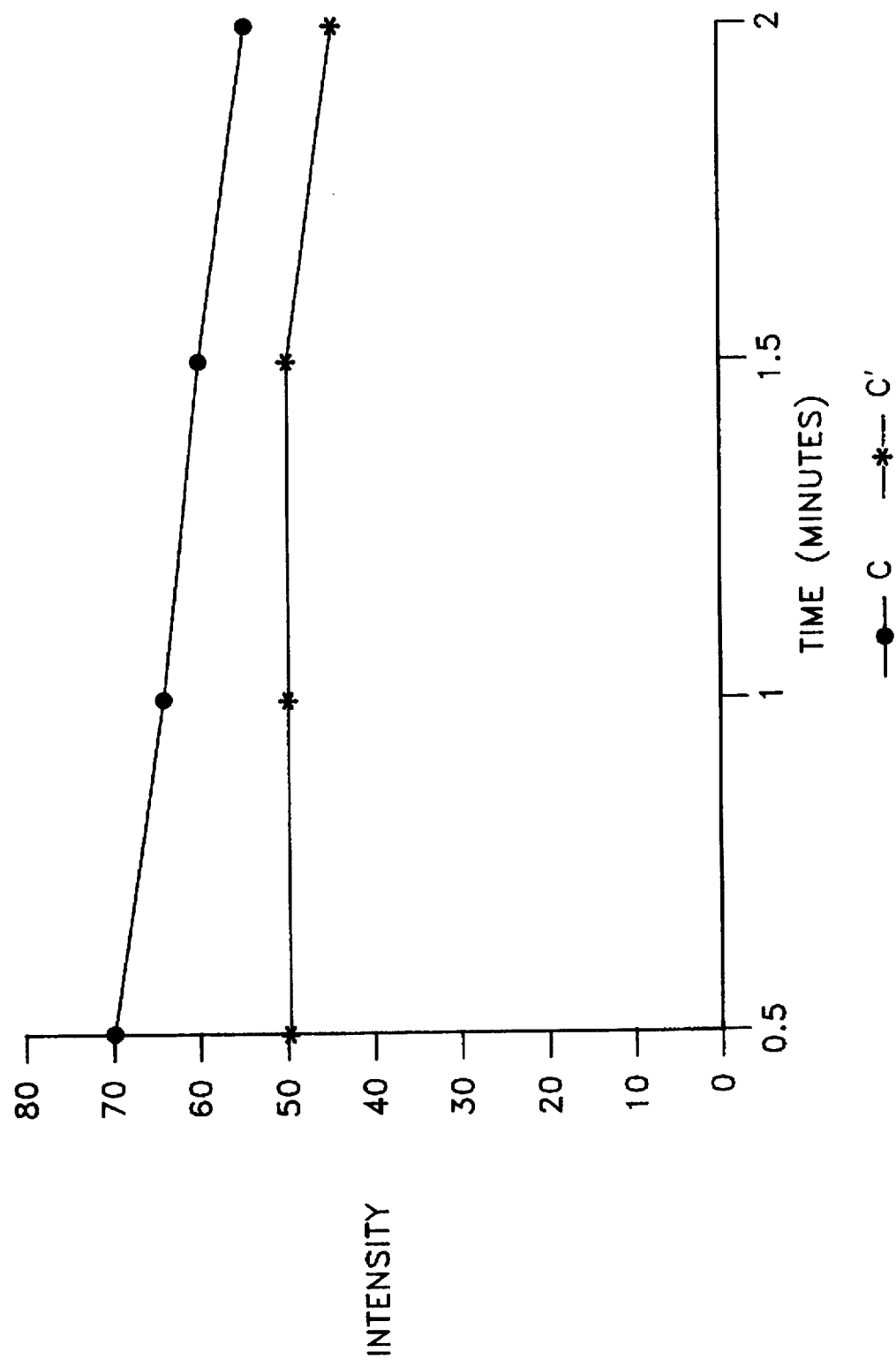
FIG-6 SWEETNESS INTENSITY VS. TIME SPEARMINT

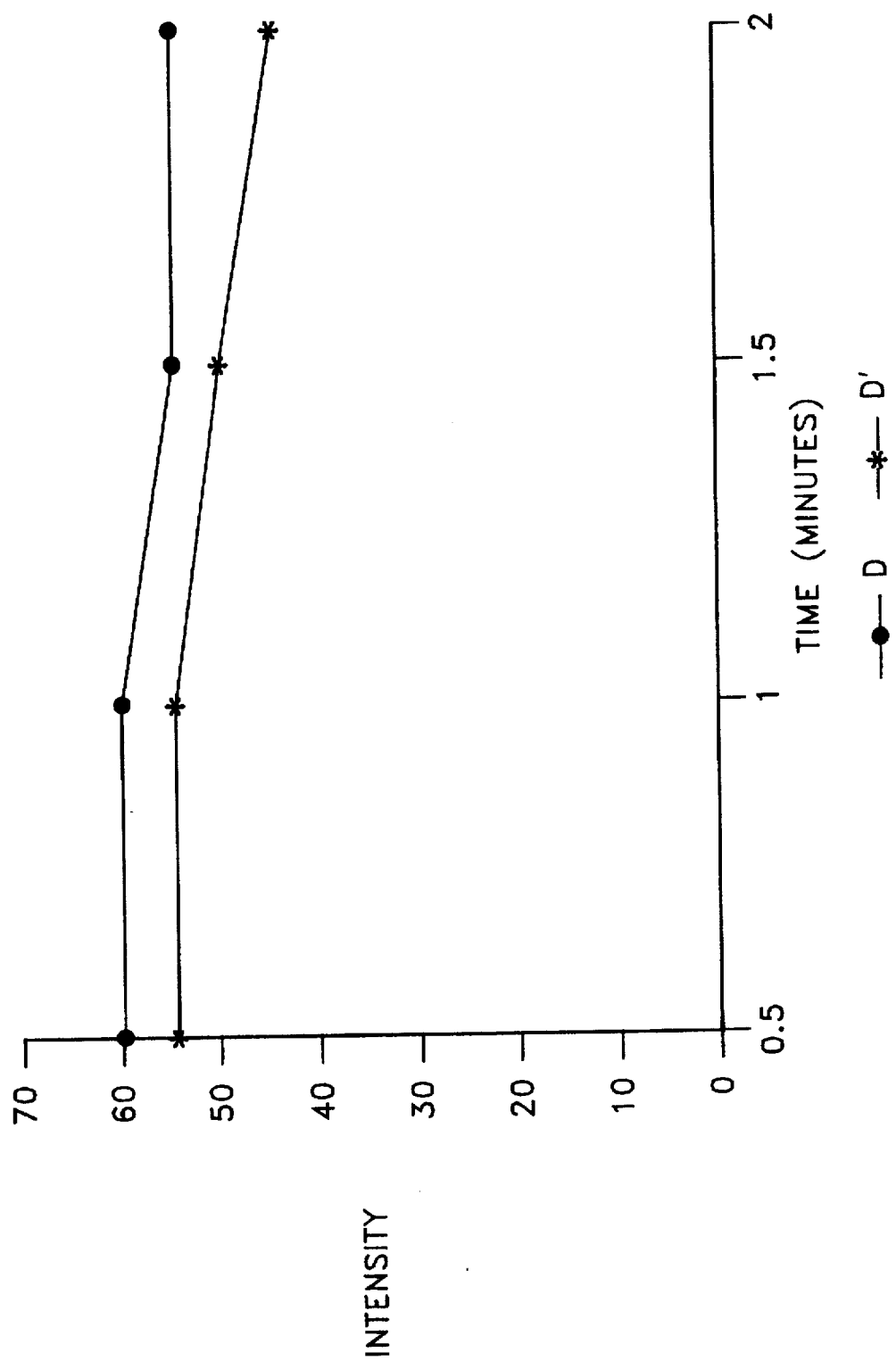

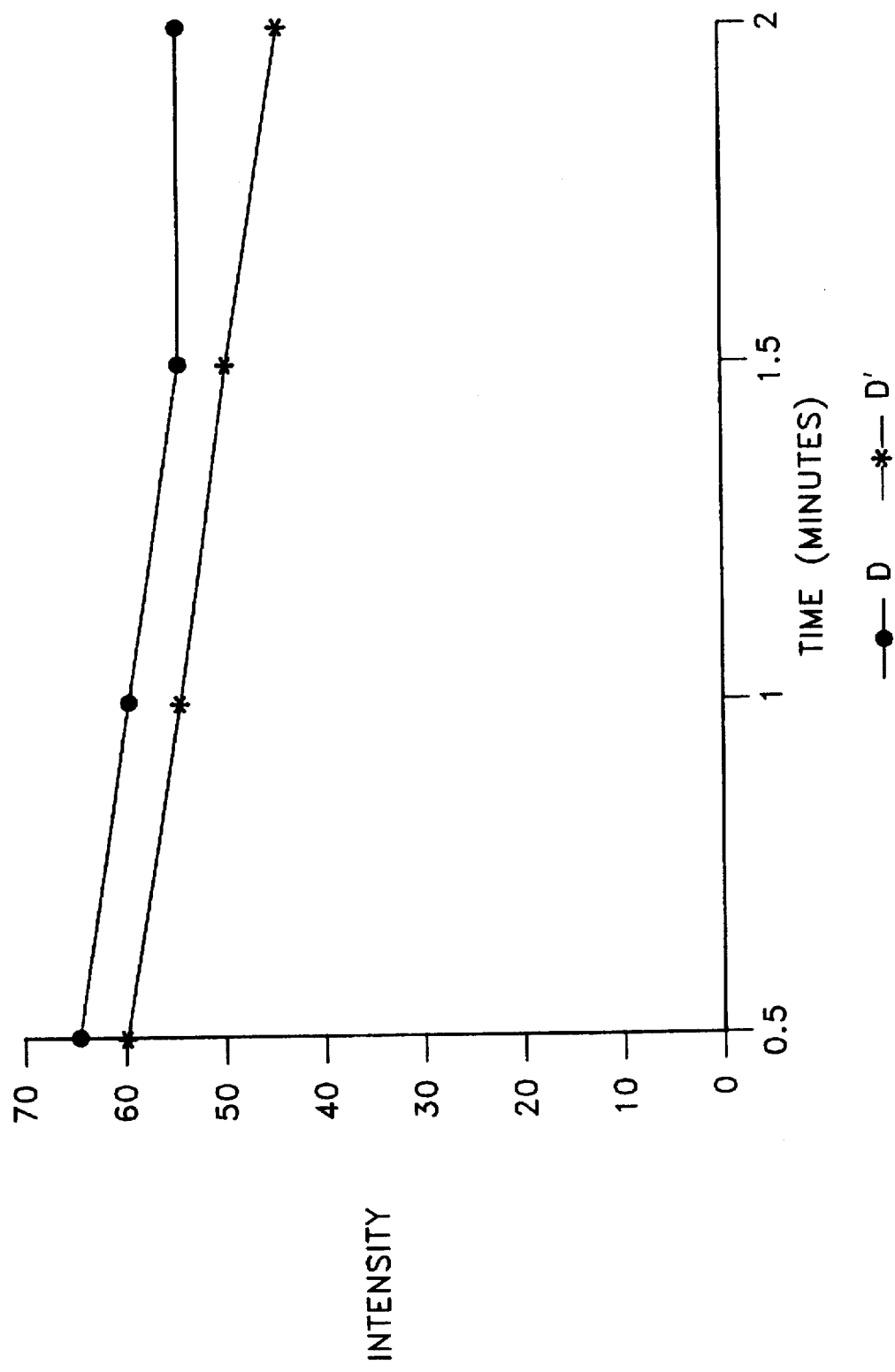

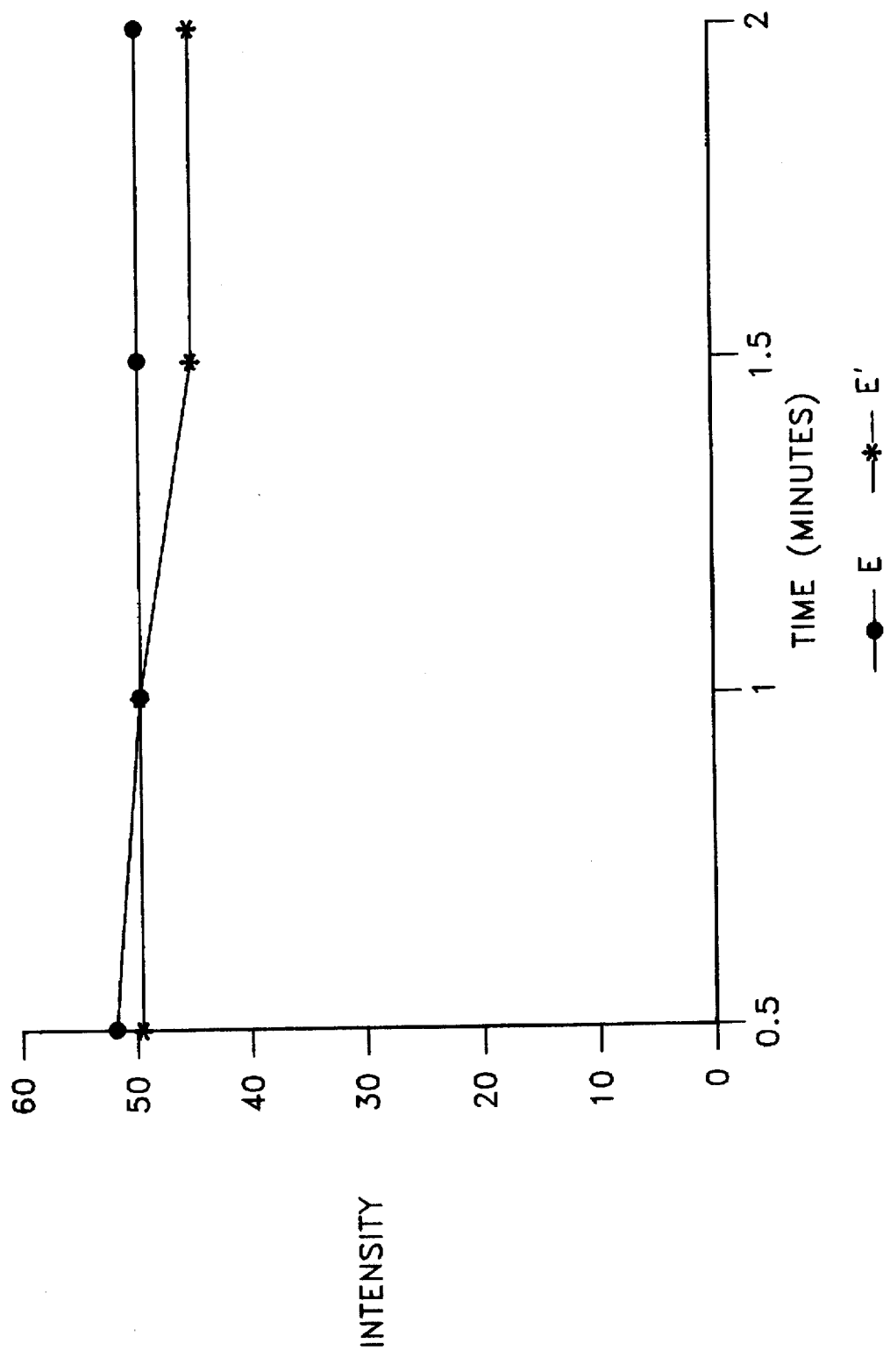

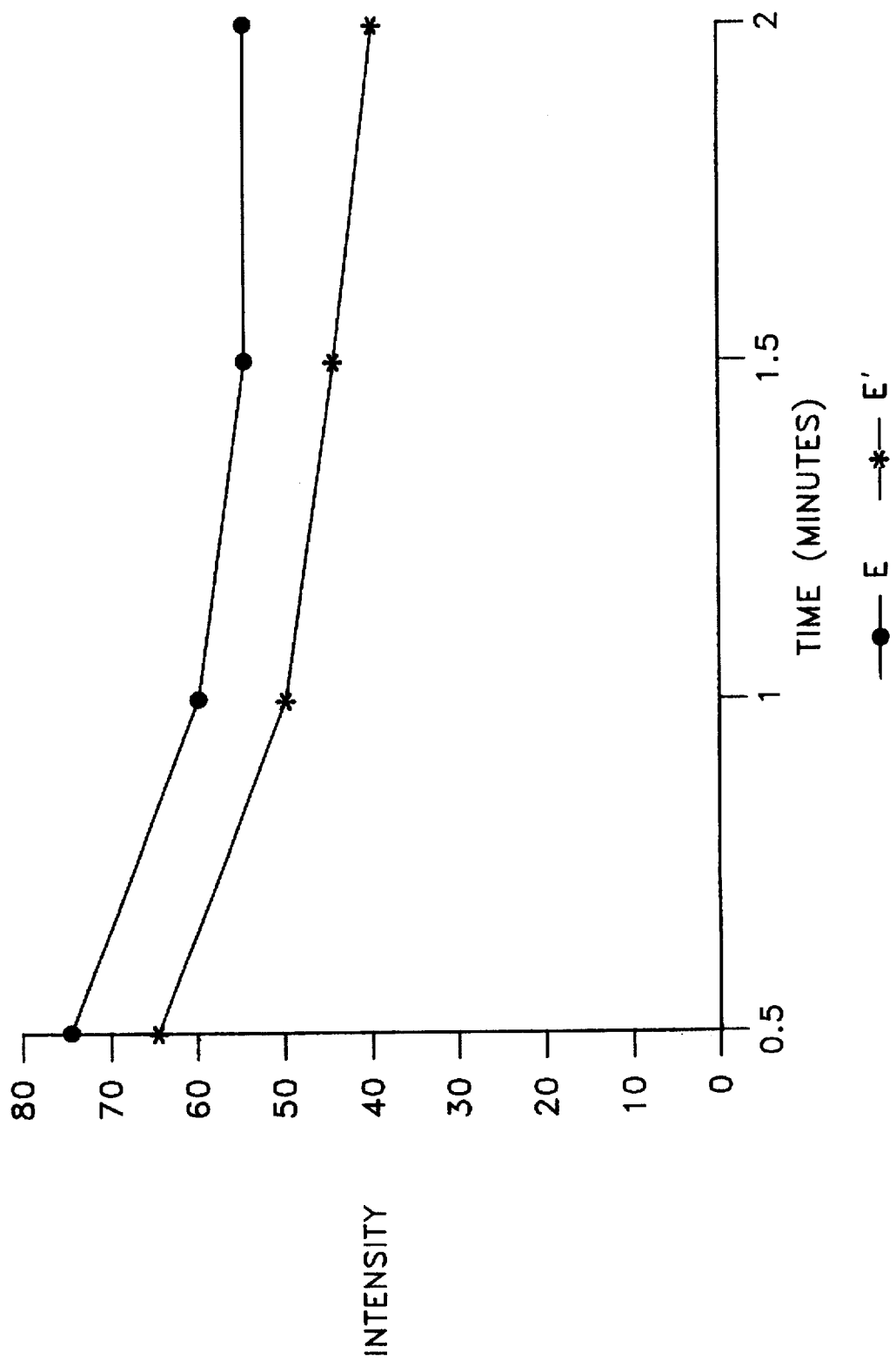
FIG-10 SWEETNESS INTENSITY VS. TIME FRUIT

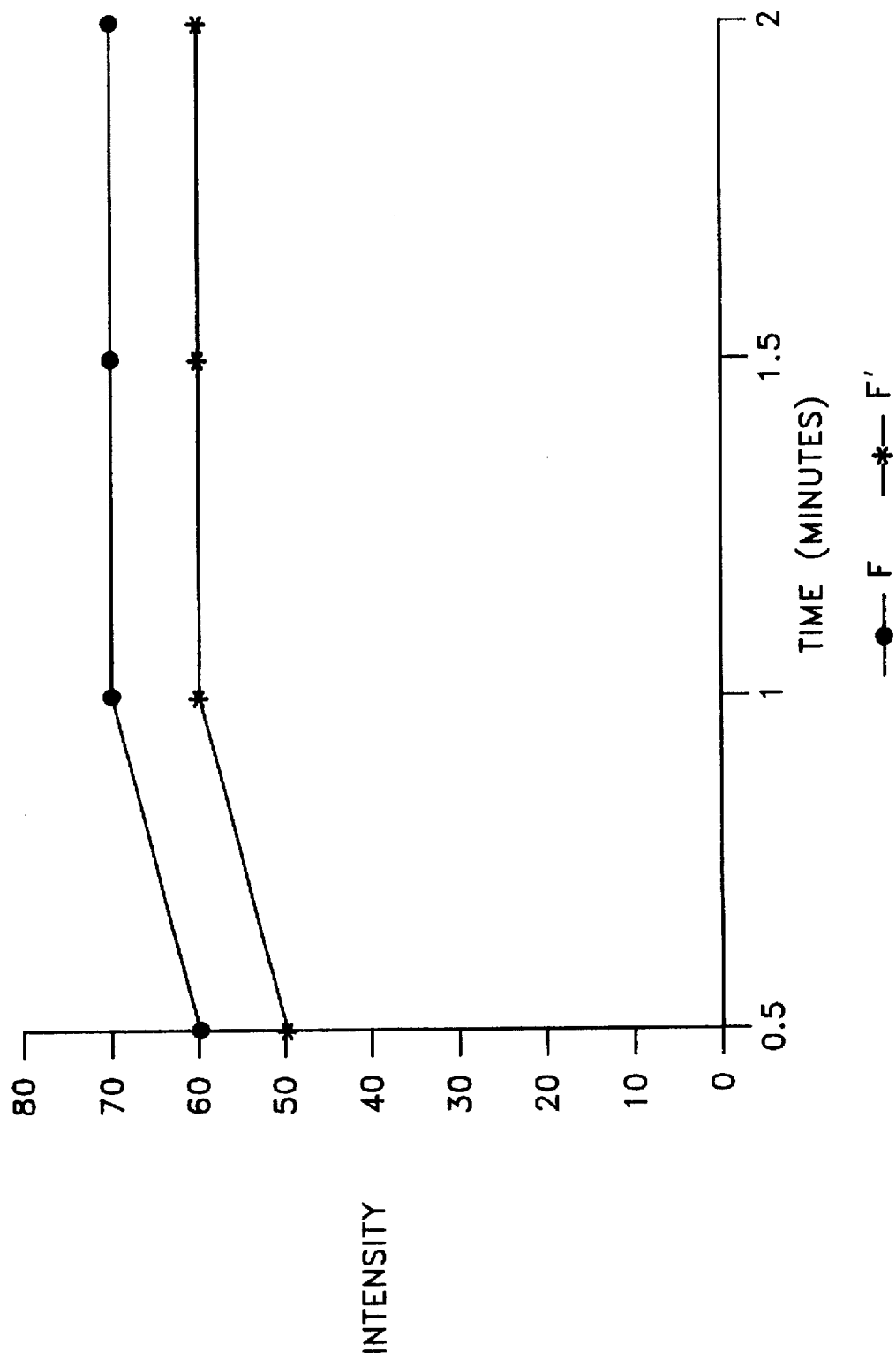

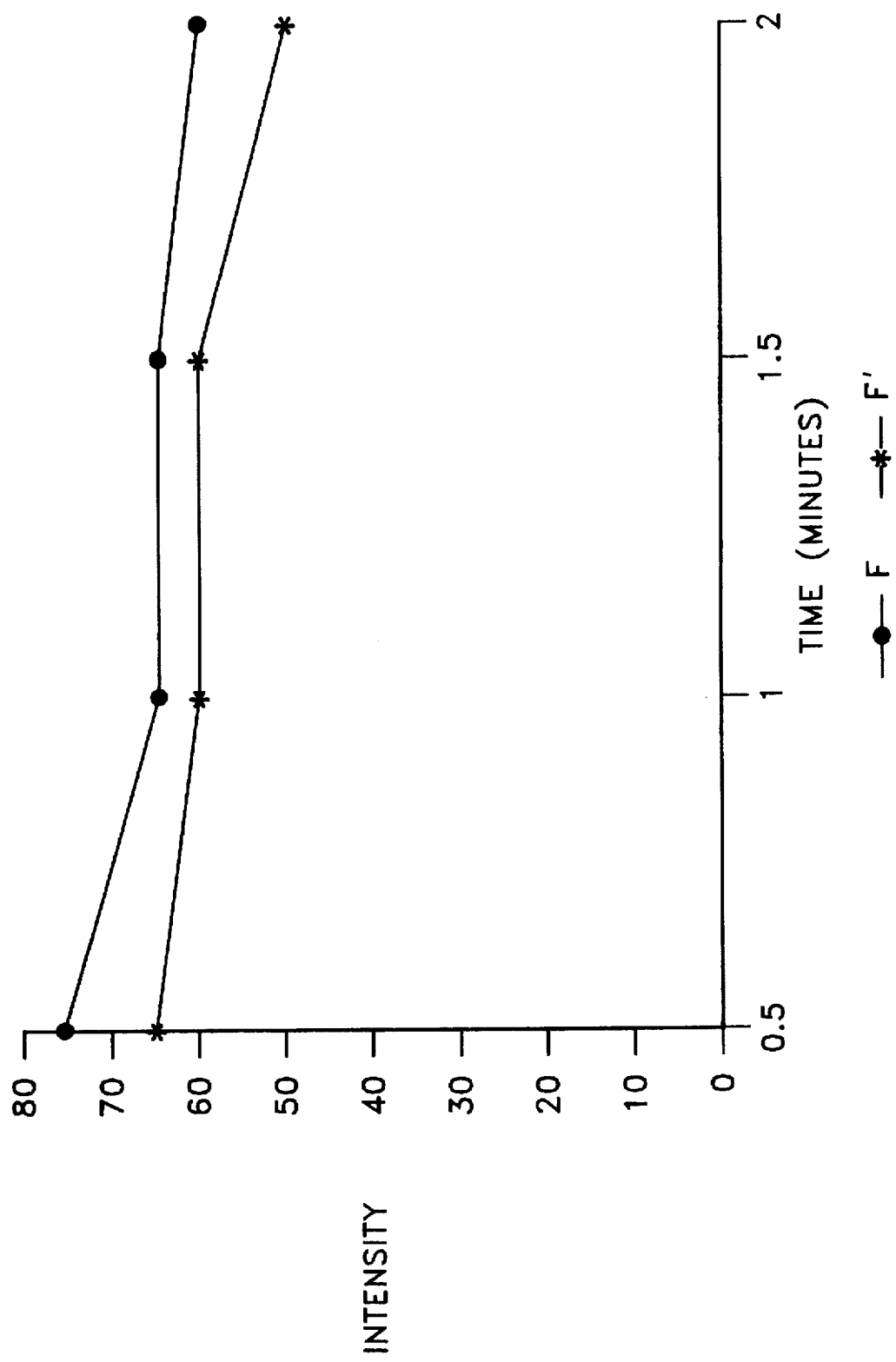
FIG-12 SWEETNESS INTENSITY VS. TIME PEPPERMINT

CHEWING GUM COMPOSITIONS HAVING INCREASED FLAVOR AND SWEETNESS AND METHODS FOR PREPARING SAME

This is a continuation of application Ser. No. 07/729,275 filed on Jul. 12, 1991 now abandoned.

BACKGROUND OF THE INVENTION

1. Field of the Invention

This invention pertains to chewing gum compositions having enhanced upfront flavor and sweetness release. More particularly, this invention pertains to chewing gum compositions containing a flavoring agent delivery system which comprises a homogeneous premix of a spray dried flavoring agent and a bulking agent. The flavoring agent delivery system may further comprise a high intensity sweetening agent. The flavoring agent delivery systems may be utilized in a wide variety of chewing gum compositions. This invention also pertains to methods for preparing these flavoring agent delivery systems and the chewing gum compositions in which they may be employed.

2. Description of the Prior Art

Chewing gums typically contain a water-insoluble gum base, a water-soluble bulking agent, a flavoring agent, and conventional additives. The gum base may also contain a plasticizing agent or softening agent to improve the consistency of the gum base. The bulking agent is generally a water-soluble sweetening agent such as sucrose or corn syrup solids or both, and in a sugarless gum, is generally sorbitol or mannitol or both, together with an intense sweetening agent.

A commonly observed problem with chewing gums is the relatively rapid loss of the simultaneous release of flavor and sweetness during chewing. Sweetening agents are generally hydrophilic compounds which tend to be quickly released from the gum within 3 to 5 minutes of chewing. Flavoring agents are generally hydrophobic compounds which tend to become trapped in the hydrophobic gum base. This is especially true for chewing gums containing a high amount of gum base. As a consequence; only about 10% of the flavoring agent is released from the gum within 3 to 5 minutes of chewing resulting in low upfront flavor release. Accordingly, chewing gums having improved upfront flavor and sweetness release during the chewing period would be desirable.

A number of methods are known for encapsulating sweetening agents or flavoring agents. For example, U.S. Pat. No. 4,673,577, issued to Patel, U.S. Pat. No. 4,863,745, issued to Zibell, and U.S. Pat. No. 4,885,175, also issued to Zibell, disclose the encapsulation of sweetening agents or flavoring agents with shellac, zein, and wax, respectively. U.S. Pat. No. 4,752,485, issued to Sharma et al., and U.S. Pat. No. 4,722,845, issued to Cherukuri et al., disclose the encapsulation of sweetening agents or flavoring agents with fatty acids or waxes. U.S. Pat. No. 4,816,265, issued to Cherukuri et al., and U.S. Pat. No. 4,740,376, issued to Yang et al., disclose the encapsulation of sweetening agents or flavoring agents with polyvinyl acetate. While these encapsulated sweetening agents and flavoring agents have modified release properties, these encapsulated agents all have delayed release properties, not upfront release properties. Moreover, in the absence of a sweetening agent, flavoring agents tend to have a strong and bitter taste.

Flavor emulsions are also known. U.S. Pat. No. 4,752,481, issued to Dokuzovic, discloses a flavoring agent emulsion having improved flavor perception which comprises a flavor oil, an emulsifying agent, and an alkyl polyol such as glycerin. emulsions also tend to be entrapped by gum base.

A number of methods are known for encapsulating combinations of sweetening agents and flavoring agents. For example, U.S. Pat. No. 4,388,328, issued to Glass, discloses a method for preparing a flavor composite which comprises a mixing mannitol, sorbitol, Saccharin, and a flavor oil at a temperature to prevent flashing off of the liquid flavor. U.S. Pat. No. 4,497,832, issued to Cherukuri et al., discloses a chewing gum having enhanced flavor and sweetness prepared by admixing a sweetening agent and water-soluble spherical particles having microporous channels to melted gum base, and admixing a flavor oil into the gum base mixture to be sorbed in the spherical particles. U.S. Pat. No. 4,786,491, issued to patel, discloses a sweetened chewing gum containing an aqueous emulsion of a high intensity sweetening agent, a hydrophobic ingredient such as a flavoring agent, and an emulsifying agent. U.S. Pat. No. 4,803,082, issued to Cherukuri et al., discloses a flavor and sweetness enhancement delivery system which comprises a spray dried flavoring agent and an intense sweetening agent encapsulated in a wax or fat.

Thus, a number of encapsulated flavoring agents and combinations of sweetening agents and flavoring agents are known. Although these encapsulated flavoring agents have modified release properties, none of these encapsulated flavoring agents are entirely satisfactory because these flavoring agents tend to become entrapped in gum base and have delayed flavor release properties. Hence, there is a need for flavoring agent compositions which do not become entrapped in gum base and which have enhanced upfront flavor release properties. The present invention provides such flavoring agent delivery systems having improved upfront flavor release and the chewing gum products in which the flavoring agent delivery systems may be used.

SUMMARY OF THE INVENTION

The present invention pertains to chewing gum composition having improved flavor and sweetness intensity which comprises (A) a gum base, (B) a bulking agent, (C) a flavoring agent, and an effective amount of a homogeneous flavoring agent delivery system to provide upfront flavor and sweetness which comprises in percentages by weight of the delivery system (a) a spray dried flavoring agent present in an amount up to about 80%, and (b) a bulking agent present in an amount up to about 90%. The flavoring agent delivery system may further comprise a high intensity sweetening agent present in an amount up to about 80%, by weight of the flavoring agent delivery system. The flavoring agent delivery systems may be used in a wide variety of chewing gum compositions. The present invention also pertains to methods for preparing the flavoring agent delivery systems and the chewing gum compositions in which they may be used.

BRIEF DESCRIPTION OF THE FIGURES

FIG. 1 depicts in graphic format the flavor intensities found at different chewing times for chewing gums containing a cinnamon flavoring agent delivery system according to the present invention and a control cinnamon flavoring agent (Examples A and A').

FIG. 2 depicts in graphic format the sweetness intensities found at different chewing times for chewing gums containing a cinnamon flavoring agent delivery system according to the present invention and a control cinnamon flavoring agent (Examples A and A').

FIG. 3 depicts in graphic format the flavor intensities found at different chewing times for chewing gums containing a wintergreen flavoring agent delivery system according to the present invention and a control wintergreen flavoring agent (Examples B and B').

FIG. 4 depicts in graphic format the sweetness intensities found at different chewing times for chewing gums containing a wintergreen flavoring agent delivery system according to the present invention and a control wintergreen flavoring agent (Examples B and B').

FIG. 5 depicts in graphic format the flavor intensities found at different chewing times for chewing gums containing a spearmint flavoring agent delivery system according to the present invention and a control spearmint flavoring agent (Examples C and C').

FIG. 6 depicts in graphic format the sweetness intensities found at different chewing times for chewing gums containing a spearmint flavoring agent delivery system according to the present invention and a control spearmint flavoring agent (Examples C and C').

FIG. 7 depicts in graphic format the flavor intensities found at different chewing times for chewing gums containing a spearmint flavoring agent delivery system according to the present invention and a control spearmint flavoring agent (Examples D and D').

FIG. 8 depicts in graphic format the sweetness intensities found at different chewing times for chewing gums containing a spearmint flavoring agent delivery system according to the present invention and a control spearmint flavoring agent (Examples D and D').

FIG. 9 depicts in graphic format the flavor intensities found at different chewing times for chewing gums containing a fruit flavoring agent delivery system according to the present invention and a control fruit flavoring agent (Examples E and E').

FIG. 10 depicts in graphic format the sweetness intensities found at different chewing times for chewing gums containing a fruit flavoring agent delivery system according to the present invention and a control fruit flavoring agent (Examples E and E').

FIG. 11 depicts in graphic format the flavor intensities found at different chewing times for chewing gums containing a peppermint flavoring agent delivery system according to the present invention and a control peppermint flavoring agent (Examples F and F').

FIG. 12 depicts in graphic format the sweetness intensities found at different chewing times for chewing gums containing a peppermint flavoring agent delivery system according to the present invention and a control peppermint flavoring agent (Examples F and F').

DETAILED DESCRIPTION OF THE INVENTION

Applicants have discovered that by premixing a spray dried flavoring agent and a bulking agent, improved flavoring agent delivery systems having enhanced upfront flavor and sweetness release can be obtained which are especially useful in chewing gums. Spray dried flavoring agents (flavor oils bound to a hydrophilic carrier) have less tendency to be entrapped in a hydrophobic gum base than flavor oils but in the absence of a sweetening agent tend to have a strong and bitter taste. By encapsulating a spray dried flavoring agent in a matrix of a hydrophilic or water-soluble bulking agent such as a bulk sweetening agent, the flavoring agent is prevented from being entrapped in the gum base and the release of the flavoring agent is coordinated with the release of the bulk sweetening agent to provide a chewing gum composition having enhanced upfront flavor and sweetness release. A high intensity sweetening agent may also be incorporated in the bulking agent matrix to provide further upfront flavor and sweetness impact. The bulking agent matrix also prevents the high intensity sweetening agent from being entrapped in the gum base and coordinates the upfront release of the spray dried flavoring agent and the high intensity sweetening agent. Accordingly use of applicants' flavoring agent delivery systems in regular or high gum base chewing gums provides improved upfront flavor release and greater flavor sensation than prior art compositions.

In accord with the present invention, a chewing gum composition is provided having improved flavor and sweetness intensity which contains a homogeneous flavoring agent delivery system which comprises in percentages by weight of the delivery system (a) a spray dried flavoring agent present in an amount up to about 80%, and (b) a bulking agent present in an amount up to about 90%.

The flavoring agents (flavors, flavorants) in the present invention are spray dried flavoring agents. Spray dried flavoring agents are flavoring oils which are bound to a hydrophilic carrier. The flavoring agents which may be used in the spray dried flavoring agents of the present invention include those flavors known to the skilled artisan such as natural and artificial flavors. These flavoring agents may be chosen from synthetic flavor oils and flavoring aromatics and/or oils, oleoresins and extracts derived from plants, leaves, flowers, fruits, and the like, and mixtures thereof. Nonlimiting representative flavoring agents include artificial, natural and synthetic flavors such as citrus oils including peppermint, spearmint, cinnamon, fruit, and wintergreen. Other flavoring agents include lemon, orange, lime, grapefruit, and fruit essences including apple, pear, peach, grape, strawberry, raspberry, cherry, plum, pineapple, apricot, and the like, and mixtures thereof. In a preferred embodiment, the flavoring agent is selected from the group consisting of peppermint oil, spearmint oil, cinnamon oil, fruit oil, wintergreen oil, and mixtures thereof.

The flavoring agents of the present invention are employed in the form of spray dried flavoring agents. Spray dried flavoring agents are prepared by forming a solution or suspension of a flavoring agent with a carrier or hydrophilic film forming agent and spray drying the mixture to entrap the flavoring agent on the carrier. The hydrophilic film forming agents in the present invention are water-soluble compounds which can form solution, suspension, or emulsion mixtures with the flavoring agent. After the mixture is dried, the film forming agent forms a thin, continuous substrate to which the flavoring agent is bound. The choice of hydrophilic film forming agent will depend upon the type of flavoring agent employed as well as upon flavoring agent release rate desired. The hydrophilic film forming agent should have the ability to prevent the flavoring agent from becoming entrapped in the gum base.

Suitable hydrophilic film forming agents which may be used in the flavoring agent delivery systems may be selected from the group consisting of gum arabic, corn syrup solids, modified starches, maltodextrin, and the like, and mixtures thereof. Preferred hydrophilic film forming agents may be selected from the group consisting of gum arabic and maltodextrin. A more preferred hydrophilic film forming agent is gum arabic.

The amount of flavoring agent employed in the spray dried flavoring agent is an effective amount to provide the desired release rate of the flavoring agent. The exact amount of the flavoring agent employed is a matter of preference subject to such factors as the type of flavoring agent employed, the type and amount of hydrophilic film forming agent employed, the type of gum base and chewing gum composition employed, and the particular release rate desired. In general, the amount of flavoring agent normally present in the spray dried flavoring agent will be from about 60% to about 90%, preferably from about 70% to about 85%, and more preferably from about 78% to about 82%, by weight of the spray dried flavoring agent.

The amount of spray dried flavoring agent employed in the flavoring agent delivery system is an effective amount to flavor a particular final product. The exact amount of spray dried flavoring agent is normally a matter of preference subject to such factors as the type of flavoring agent employed, the type of hydrophilic film forming agent employed, the gum base employed, the final chewing gum composition, and the strength of flavor desired. Thus, the amount of spray dried flavoring agent may be varied in order to obtain the result desired in the final product and such variations are within the capabilities of those skilled in the art without the need for undue experimentation. In general, the spray dried flavoring agent will be present in the flavoring agent delivery system in an amount up to about 80%, preferably from about 15% to about 30%, and more preferably from about 20% to about 28%, by weight of the flavoring agent delivery system.

The bulking agents (carriers, extenders) in the present invention are hydrophilic or water-soluble bulking agents and may be selected from the group consisting of, but not limited to, monosaccharides, disaccharides, polysaccharides, sugar alcohols, and mixtures thereof; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses, and the like, and mixtures thereof.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. When the chewing gum composition is a sugar gum, mixtures of sucrose and corn syrup solids are the preferred sugar bulking agents.

Suitable sugar alcohol bulking agents include sorbitol, xylitol, mannitol, galactitol, maltitol, erythritol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

In a preferred embodiment, the bulking agent in the flavoring agent delivery system is selected from the group consisting of sorbitol, mannitol, maltitol, xylitol, sucrose, fructose, maltodextrin, polydextrose, and mixtures thereof.

The amount of bulking agent employed in the flavoring agent delivery system is an effective amount to provide sweetness to the chewing gum and to prevent the spray dried flavoring agent from becoming entrapped in the gum base. The exact amount of bulking agent is normally a matter of preference subject to such factors as the type of spray dried flavoring agent employed, the type of bulking agent employed, the gum base employed, and the final chewing gum composition desired. Thus, the amount of bulking agent may be varied in order to obtain the result desired in the final product and such variations are within the capabilities of those skilled in the art without the need for undue experimentation. In general, the bulking agent will be present in the flavoring agent delivery system in an amount up to about 90%, preferably from about 40% to about 70%, and more preferably from about 45% to about 65%, by weight of the flavoring agent delivery system.

In another embodiment, the flavoring agent delivery system may further comprise a high intensity sweetening agent present. The high intensity sweetening agents in the present invention are sweetening agents which have a sweetness intensity substantially greater than that of sucrose. The high intensity sweetening agents may be used in solid or solution form. Suitable high intensity sweetening agents include water-soluble natural sweetening agents such as dihydrochalcones, monellin, Stevia Rebaudiana (steviosides), glycyrrhizin, and mixtures thereof. Suitable water-soluble artificial sweetening agents include Saccharin and its soluble salts, i.e., sodium and calcium Saccharin salts, cyclamate and its salts, 3,4-dihydro-6-methyl-1,2,3-oxathiazine-4-one-2,2-dioxide (Acesulfame) and the sodium, ammonium, and calcium salts thereof, and especially the potassium salt of 3,4-dihydro-6-methyl-1,2,3-oxathiazine-4-one-2,2-dioxide (Acesulfame-K).

Suitable dipeptide based sweetening agents include L-aspartic acid derived sweetening agents such as L-aspartyl-L-phenylalanine methyl ester (Aspartame), compounds described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenyl-alanins, and L-aspartyl-L-(1-cyclohexen)alanine.

Other suitable water-soluble sweetening agents include those derived from naturally occurring water-soluble sweetening agents such as chlorinated derivatives of sucrose, e.g., chlorodeoxysugar derivatives such as derivatives of chlorodeoxysucrose and chlorodeoxygalactosucrose. Examples of chlorodeoxysucrose and chlorodeoxygalactosucrose derivatives include but are not limited to 1-chloro-1'-deoxysucrose; 4-chloro-4-deoxy-alpha-D-galacto-pyranosyl-alpha-D-fructofuranoside, or 4-chloro-4-deoxygalactosucrose; 4-chloro-4-deoxy-alpha-D-galacto-pyranosyl-1-chloro-1-deoxy-beta-D-fructofuranoside, or 4,1'-dichloro-4,1'-dideoxygalactosucrose; 1',6'-dichloro-1', 6'-dideoxysucrose; 4-chloro-4-deoxy-alpha-D-galacto-pyranosyl-1,6-dichloro-1,6-dideoxy-beta-D-fructofuranoside, or 4,1'6'-trichloro-4,1',6'-trideoxygalacto-sucrose; 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose; 6,1'6'-trichloro-6,1',6α-trideoxysucrose; 4,6-dichloro-4,6-dideoxy-alpha-D-galacto-pyranosyl-1,6-dichloro-1,6-dideoxy-beta-D-fructofuranoside, or 4,6,1'6'-tetrachloro-4,6, 1',6'-tetradeoxygalacto-sucrose; and 4,6,1'6'-tetrachloro-4,6, 1',6'-tetradeoxy-sucrose. In a preferred embodiment, the chlorodeoxysugar derivative is 4,1,',6'-trichloro-4,1',6'-trideoxygalactosucrose, or 4-chloro-4-deoxy-alpha-D-galactopyranosyl-1,6-dichloro-1,6-dideoxy-beta-D- fructofuranoside, which is commercially available under the tradename Sucralose from McNeil Specialty Products Company, Skillman, New Jersey.

Other suitable high intensity sweetening agents include protein based sweetening agents such as talin (thaumaoccous danielli, Thaumatin I and II).

The amount of high intensity sweetening agent employed in the flavoring agent delivery system is an effective amount to provide upfront sweetness and flavor to the chewing gum. The exact amount of high intensity sweetening agent is normally a matter of preference subject to such factors as the type of high intensity sweetening agent employed, the type of spray dried flavoring agent employed, the type of bulking agent employed, and the final chewing gum composition desired. Thus, the amount of high intensity sweetening agent may be varied in order to obtain the result desired in the final product and such variations are within the capabilities of those skilled in the art without the need for undue experimentation. In general, the high intensity sweetening agent will be present in the flavoring agent delivery system in an amount up to about 80%, preferably from about 5% to about 40%, and more preferably from about 5% to about 15%, by weight of the flavoring agent delivery system.

In another embodiment, the flavoring agent delivery system may further comprise a binding agent. The binding agent is an agent which will aid the spray dried flavoring agent, and the high intensity sweetening agent when present, to bind or adhere to the bulking agent matrix. As set out above, the high intensity sweetening agents may be used in solid or solution form. Binding agents are especially useful when the high intensity sweetening agent is used in powder form. Suitable binding agents include glycerin, sorbitol solution, hydrogenated glucose syrup, corn syrup, high fructose corn syrup, propylene glycol, and the like, and mixtures thereof. In a preferred embodiment, the binding agent will be present in the flavoring agent delivery system in an amount up to about 30%, preferably up to about 10%, and more preferably up to about 5%, by weight of the flavoring agent delivery system.

The present invention extends to methods for preparing the flavoring agent delivery systems. In such a method, the flavoring agent delivery system is prepared at room temperature by admixing the spray dried flavoring agent, the bulking agent, and the high intensity sweetening agent when present, to form a homogeneous mixture. The spray dried flavoring agent is preferably added portionwise to the bulking agent. The high intensity sweetening agent and the binding agent, when present, are then preferably added to the mixture. The product may then be screened such as through a Mesh no. 12 screen.

The final flavoring agent delivery system compositions are readily prepared using standard methods and apparatus generally known by those skilled in the confectionery and pharmaceutical arts. The apparatus useful in accordance with the present invention comprises mixing apparatus well known in the confectionery and pharmaceutical arts, and therefore the selection of the specific apparatus will be apparent to the artisan.

The combination of the spray dried flavoring agent, bulking agent, and high intensity sweetening agent, when present, set out above results in an improved flavoring agent delivery system which may be employed in a wide variety of chewing gum compositions.

An important aspect of the present invention includes an improved chewing gum composition incorporating the inventive flavoring agent delivery system and a method for preparing the chewing gum composition, including both chewing gum and bubble gum formulations. In general, the improved chewing gum compositions will contain a gum base, a bulking agent, a flavoring agent such as a combination of a flavor oil and a spray dried flavoring agent, an effective amount of the inventive flavoring agent delivery system, and various additives such as a high intensity sweetening agent.

The chewing gum compositions may be chewing gums employing high levels of a chewing gum base having an enhanced hydrophilic character. These chewing gums will comprise a gum base present in an amount from about 50% to about 85%, preferably from about 50% to about 75%, and more preferably from about 60% to about 70%, by weight of the chewing gum composition. When a high gum base product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low bulking agent gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew. texture. Chewing gum compositions prepared with such gum bases in high levels are less hygroscopic (have lower moisture-pickup) and are less prone to becoming stale than conventional gum compositions while having comparable firmness and texture.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 16%, and preferably in amounts from about 5% to about 14%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In one embodiment, the invention pertains to a chewing gum composition which comprises a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25% by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

Chewing gum compositions employing a high level of a chewing gum base having an enhanced hydrophilic character are more fully described in U.S. Pat. No. 4,872,884, which disclosure is incorporated herein by reference.

Other gum bases having an enhanced hydrophilic nature and suitable for use in chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive flavoring agent delivery system and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 85%, preferably from about 50% to about 75%, and more preferably from about 60% to about 70%, by weight of the chewing gum composition.

In another embodiment, the invention pertains to a chewing gum composition which contains lower amounts of a chewing gum base. In general, the gum base in these chewing gum compositions will be present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the flavoring agent delivery system of the present invention and conventional additives to prepare a wide variety of chewing gum compositions.

The chewing gum compositions generally include bulking agents. These bulking agents (carriers, extenders) may be water-soluble and include bulking agents selected from the group consisting of, but not limited to, monosaccharides, disaccharides, polysaccharides, sugar alcohols, and mixtures thereof; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Illustrative examples of bulking agents have been set out above. Bulking agents may be used in amounts up to about 60%, and preferably in amounts from about 25% to about 60%, by weight of the chewing gum composition.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, an%se), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and a prolonged sensation of flavor. Such physical forms include, without being limited to, free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Nonlimiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be used individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The chewing gum compositions may also include a high intensity sweetening agent (sweeteners). High intensity sweetening agents have a sweetness intensity substantially greater than that of sucrose. Suitable high intensity sweetening agents include water-soluble natural sweetening agents such as dihydrochalcones, monellin, Stevia Rebaudiana (steviosides), glycyrrhizin, and mixtures thereof.

Suitable water-soluble artificial sweetening agents include Saccharin and its soluble salts, i.e., sodium and calcium Saccharin salts, cyclamate and its salts, 3,4-dihydro-6-methyl-1,2,3-oxathiazine-4-one-2,2-dioxide (Acesulfame) and the sodium, ammonium, and calcium salts thereof, and especially the potassium salt of 3,4-dihydro-6-methyl-1,2,3-oxathiazine-4-one-2,2-dioxide (Acesulfame-K).

Suitable dipeptide based sweetening agents include L-aspartic acid derived sweetening agents such as L-aspartyl-L-phenylalanine methyl ester (Aspartame), compounds described in U.S. Pat. No. 3,492,131, L-alpha-aspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenylglycine, L-aspartyl-2,5-dihydro-L-phenylalanine, and L-aspartyl-L-(1-cyclohexen)alanine.

Other suitable water-soluble sweetening agents include those derived from naturally occurring water-soluble sweetening agents such as chlorinated derivatives of sucrose, e.g., chlorodeoxysugar derivatives such as derivatives of chlorodeoxysucrose and chlorodeoxygalactosucrose. In a preferred embodiment, the chlorodeoxysugar derivative is 4,1',6'-trichloro-4,1',6'-trideoxygalacto-sucrose, or 4-chloro-4-deoxy-alpha-D-galactopyranosyl-1,6-dichloro-1,6-dideoxy-beta-D-fructofuranoside, which is commercially available under the tradename Sucralose from McNeil Specialty Products Company, Skillman, New Jersey.

Other suitable high intensity sweetening agents include protein based sweetening agents such as talin (thaumaoccous danielli, Thaumatin I and II).

The amount of the high intensity sweetening agent employed in the chewing gum composition is an effective amount to sweeten the chewing gum. In general, the amount of high intensity sweetening agent normally present in a chewing gum composition will be from about 0.1% to about 60%, preferably from about 1% to about 50%, and more preferably from about 35% to about 45%, by weight of the chewing gum composition.

The gum composition may include effective amounts of conventional additives selected from the group consisting of plasticizers, softeners, emulsifiers, waxes, fillers, mineral adjuvants, coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetening agent, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl-N-P-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the flavoring agent delivery system of the present invention may be admixed into the chewing gum composition. The exact amount of flavoring agent delivery system employed is normally a matter of preference subject to such factors as the particular type of gum composition being prepared, the type of gum base and bulking agent employed, the type of flavor employed and the intensity of flavor desired. Thus, the amount of flavoring agent delivery system may be varied in order to obtain the result desired in the final product and such variations are within the capabilities of those skilled in the art without the need for undue experimentation. In general, the amount of flavoring agent delivery system normally present in a chewing gum composition will be from about 0.01% to about 5%, preferably from about 0.2% to about 2.5%, and more preferably from about 0.5% to about 1%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the flavoring agent delivery system and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive flavoring agent composition, plasticizer, the softener, the bulking agent, and/or fillers, coloring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

In a preferred embodiment, the invention is directed at a method for preparing a chewing gum composition having improved flavor and sweetness intensity which comprises the steps of:

(1) providing the following ingredients;
    (A) a gum base;
    (B) a bulking agent;
    (C) a flavoring agent; and
    (D) an effective amount of a homogeneous flavoring agent delivery system to provide upfront flavor and sweetness which comprises in percentages by weight of the delivery system:
        (a) a spray dried flavoring agent present in an amount up to about 80%; and
        (b) a bulking agent present in an amount up to about 90%;

(2) melting the gum base from step (A);

(3) mixing the components of the flavoring agent delivery system from step (D) to form a homogeneous mixture;

(4) admixing the bulking agent from step (B), the flavoring agent from step (C), and the homogeneous flavoring agent delivery system from step (3) with the melted gum base from step (2); and (5) forming the mixture from step (4) into suitable gum shapes.

In another embodiment, the present invention is directed at a chewing gum composition having improved flavor and sweetness intensity prepared by a method which comprises the steps of:

(1) providing the following ingredients;
  (A) a gum base;
  (B) a bulking agent;
  (C) a flavoring agent; and
  (D) an effective amount of a homogeneous flavoring agent delivery system to provide upfront flavor and sweetness which comprises in percentages by weight of the delivery system:
    (a) a spray dried flavoring agent present in an amount up to about 80%; and
    (b) a bulking agent present in an amount up to about 90%;

(2) melting the gum base from step (A);

(3) mixing the components of the flavoring agent delivery system from step (D) to form a homogeneous mixture;

(4) admixing the bulking agent from step (B), the flavoring agent from step (C), and the homogeneous flavoring agent delivery system from step (3) with the melted gum base from step (2); and (5) forming the mixture from step (4) into suitable gum shapes.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES 1–6

These examples demonstrate the preparation of the flavoring agent delivery systems according to the method of the present invention.

The compositions of the flavoring agent delivery systems of EXAMPLES 1–6 are set out below in TABLE 1.

TABLE 1

FLAVORING AGENT DELIVERY SYSTEMS

| Ingredient | Examples (Percent by Dry Weight) | | | | | |
|---|---|---|---|---|---|---|
|  | 1 | 2 | 3 | 4 | 5 | 6 |
| Sorbitol | 60 | 60 | 60 | — | 78 | 60 |
| Mannitol | — | — | — | 60 | — | — |
| Sucralose (25% solution) | 15 | 15 | 15 | 10 | 10 | 15 |
| Glycerin | — | — | — | 10 | — | — |
| Spray Dried Cinnamon Flavor | 25 | — | — | — | — | — |
| Spray Dried Wintergreen Flavor | — | 25 | — | — | — | — |
| Spray Dried Spearmint Flavor | — | — | 25 | 20 | — | — |
| Spray Dried Fruit Flavor | — | — | — | — | 12 | — |
| Spray Dried Peppermint Flavor | — | — | — | — | — | 25 |

The spray dried flavoring agents of EXAMPLES 1–6 were prepared as follows. The hydrophilic film forming agent (gum arabic) was admixed with deionized water at about 80° C. to form a solution. The solution was then cooled to about 60° C. and the flavor oil was admixed. The mixtures were then spray dried. One half of the spray dried flavoring agent was then admixed at room temperature with the bulking agent (sorbitol, mannitol). Then the second half of the spray dried flavoring agent was admixed with the above mixture together with the high intense sweetening agent (25% aqueous solution of Sucralose) and the binding agent (glycerin), when present.

EXAMPLES A–F AND A'–F'

These examples demonstrate the preparation of chewing gum compositions containing the flavoring agent delivery systems prepared according to the method of the present invention.

The flavoring agent delivery systems of Examples 1–6 were incorporated into the chewing gum compositions of Examples A–F set out in Table 2 according to conventional chewing gum manufacturing techniques.

TABLE 2

INVENTIVE CHEWING GUM COMPOSITIONS

| Ingredient | Examples (Percent by Dry Weight) | | | | | |
|---|---|---|---|---|---|---|
|  | A | B | C | D | E | F |
| Gum Base | 65.00% | 65.00% | 65.00% | 65.00% | 65.00% | 65.00% |
| Bulking Agent | 24.15% | 24.90% | 24.93% | 23.93% | 25.80% | 25.50% |
| Flavoring Agent | 1.80% | 2.55% | 2.55% | 2.55% | 2.25% | 2.75% |
| Sucralose (25%) (ppm) | 1.20% 3000 | 1.20% 3000 | 1.20% 3000 | 1.20% 3000 | 1.20% 3000 | 1.20% 3000 |
| Softening Agent | 6.90% | 5.40% | 5.40% | 6.40% | 4.80% | 4.80% |
| Coloring Agent | 0.20% | 0.20% | 0.17% | 0.17% | 0.20% | —% |
| Example 1 | 0.75% |  |  |  |  |  |
| Example 2 |  | 0.75% |  |  |  |  |
| Example 3 |  |  | 0.75 |  |  |  |
| Example 4 |  |  |  | 0.75% |  |  |
| Example 5 |  |  |  |  | 0.75% |  |
| Example 6 |  |  |  |  |  | 0.75% |

The control chewing gum compositions of Examples A'–F', which did not contain the flavoring agent delivery systems of the present invention, are set out in Table 3. These gums were also prepared according to conventional chewing gum manufacturing techniques.

TABLE 3

CONTROL CHEWING GUM COMPOSITIONS

Examples (Percent by Dry Weight)

| Ingredient | A' | B' | C' | D' | E' | F' |
|---|---|---|---|---|---|---|
| Gum Base | 65.00% | 65.00% | 65.00% | 65.00% | 65.00% | 65.00% |
| Bulking Agent | 24.60% | 25.35% | 25.38% | 24.38% | 26.39% | 25.95% |
| Sucralose | 1.31% | 1.31% | 1.31% | 1.27% | 1.27% | 1.31% |
| (25%) (ppm) | 3281 | 3281 | 3281 | 3188 | 3188 | 3281 |
| Softening Agent | 6.90% | 5.40% | 5.40% | 6.48% | 4.80% | 4.80% |
| Coloring Agent | 0.20% | 0.20% | 0.17% | 0.17% | 0.20% | —% |
| Flavoring Agent | 1.99% | 2.74% | 2.74% | 2.70% | 2.34% | 2.94% |

An expert taste panel evaluated the relative flavor and sweetness intensities at different chewing times of the chewing gums of Examples A—F (inventive), and Examples A'—F'(controls) (on a scale of 0–100, 0 being not sweet or flavorful, and 100 being very sweet and flavorful) in random order and the findings were pooled and averaged. The results from the taste panel are set out in graphic format in FIGS. 1–12.

FIGS. 1–12 show that the flavor and sweetness intensities found at different chewing times for the chewing gums containing the flavoring agent delivery systems according to the present invention (Examples A–F) were greater than the corresponding control chewing gums (Examples A'–F'). Hence, the chewing gum compositions containing the flavoring agent delivery systems of the present invention have improved upfront flavor and sweetness release.

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum composition having improved flavor and sweetness intensity which comprises:
   (A) a gum base;
   (B) a bulking agent;
   (C) a flavoring agent; and
   (D) an effective amount of a homogeneous hydrophilic flavoring agent delivery system to provide upfront flavor and sweetness which consists essentially of, in percentages by weight of the delivery system:
      (a) a spray dried flavoring agent present in an amount up to about 80%; and
      (b) a bulking agent present in an amount up to about 90%.

2. The chewing gum composition according to claim 1, wherein the gum base is present in an amount up to about 55%, by weight of the chewing gum composition.

3. The chewing gum composition according to claim 1, wherein the gum base has an enhanced hydrophilic character and is present in an amount from about 50% to about 85%, by weight of the chewing gum composition.

4. The chewing gum composition according to claim 1, wherein the flavoring agent delivery system is present in the chewing gum composition in an amount from about 0.01% to about 5%, by weight of the chewing gum composition.

5. The chewing gum composition according to claim 1, wherein the spray dried flavoring agent present in the flavoring agent delivery system is present in an amount from about 15% to about 30%, by weight of the flavoring agent delivery system.

6. The chewing gum composition according to claim 1, wherein the bulking agent present in the flavoring agent delivery system is present in an amount from about 40% to about 70%, by weight of the flavoring agent delivery system.

7. The chewing gum composition according to claim 1, wherein the spray dried flavoring agent present in the flavoring agent delivery system is selected from the group consisting of peppermint oil, spearmint oil, cinnamon oil, fruit oil, wintergreen oil, and mixtures thereof.

8. The chewing gum composition according to claim 1, wherein the bulking agent present in the flavoring agent delivery system is selected from the group consisting of sorbitol, mannitol, maltitol, xylitol, sucrose, fructose, maltodextrin, polydextrose, and mixtures thereof.

9. The chewing gum composition according to claim 1, wherein the flavoring agent delivery system further comprises a high intensity sweetening agent present in an amount up to about 80%, by weight of the flavoring agent delivery system.

10. The chewing gum composition according to claim 9, wherein the high intensity sweetening agent is present in the flavoring agent delivery system in an amount from about 5% to about 40%, by weight of the flavoring agent delivery system.

11. The chewing gum composition according to claim 9, wherein the high intensity sweetening agent present in the flavoring agent delivery system is selected from the group consisting of Saccharin, Acesulfame-K, Aspartame, Sucralose, and mixtures thereof.

12. The chewing gum composition according to claim 1, wherein the flavoring agent delivery system further comprises a binding agent present in an amount up to about 30%, by weight of the flavoring agent delivery system.

13. A method for preparing a chewing gum composition having improved flavor and sweetness intensity which comprises the steps of:
   (1) providing the following ingredients;
      (A) a gum base;
      (B) a bulking agent;
      (C) a flavoring agent; and
      (D) an effective amount of a homogeneous hydrophilic flavoring agent delivery system to provide upfront flavor and sweetness which consists essentially of, in percentages by weight of the delivery system:
         (a) a spray dried flavoring agent present in an amount up to about 80%; and
         (b) a bulking agent present in an amount up to about
   (2) melting the gum base;
   (3) mixing the components of the flavoring agent delivery system to form a homogenous mixture;
   (4) admixing the bulking agent, the flavoring agent, and the homogeneous flavoring agent delivery system from step (3) with the melted gum base from step (2), and
   (5) forming the mixture from step (4) into suitable gum shapes.

14. The method according to claim 13, wherein the gum base is present in an amount up to about 55%, by weight of the chewing gum composition.

15. The method according to claim 13, wherein the gum base has an enhanced hydrophilic character and is present in an amount from about 50% to about 85%, by weight of the chewing gum composition.

16. The method according to claim 13, wherein the flavoring agent delivery system is present in the chewing gum composition in an amount from about 0.01% to about 5%, by weight of the chewing gum composition.

17. The method according to claim 13, wherein the spray dried flavoring agent present in the flavoring agent delivery system is present in an amount from about 15% to about 30%, by weight of the flavoring agent delivery system.

18. The method according to claim 13, wherein the bulking agent present in the flavoring agent delivery system is present in an amount from about 40% to about 70%, by weight of the flavoring agent delivery system.

19. The method according to claim 13, wherein the flavoring agent delivery system further comprises a high intensity sweetening agent present in an amount up to about 80%, by weight of the flavoring agent delivery system.

20. The method according to claim 19, wherein the high intensity sweetening agent is present in the flavoring agent delivery system in an amount from about 5% to about 40%, by weight of the flavoring agent delivery system.

21. A chewing gum composition having improved flavor and sweetness intensity prepared by a method which comprises the steps of:

(1) providing the following ingredients;
  (A) a gum base;
  (B) a bulking agent;
  (C) a flavoring agent; and
  (D) an effective amount of a homogeneous hydrophilic flavoring agent delivery system to provide upfront flavor and sweetness which consists essentially of, in percentages by weight of the delivery system:
    (a) a spray dried flavoring agent present in an amount up to about 80%; and
    (b) a bulking agent present in an amount up to about (2) melting the gum base;

(3) mixing the components of the flavoring agent delivery system to form a homogeneous mixture;

(4) admixing the bulking agent, the flavoring agent, end the homogeneous flavoring agent delivery system from step (3) with the melted gum base from step (2) and (5) forming the mixture from step (4) into suitable gum shapes.

* * * * *